Patented Dec. 26, 1950

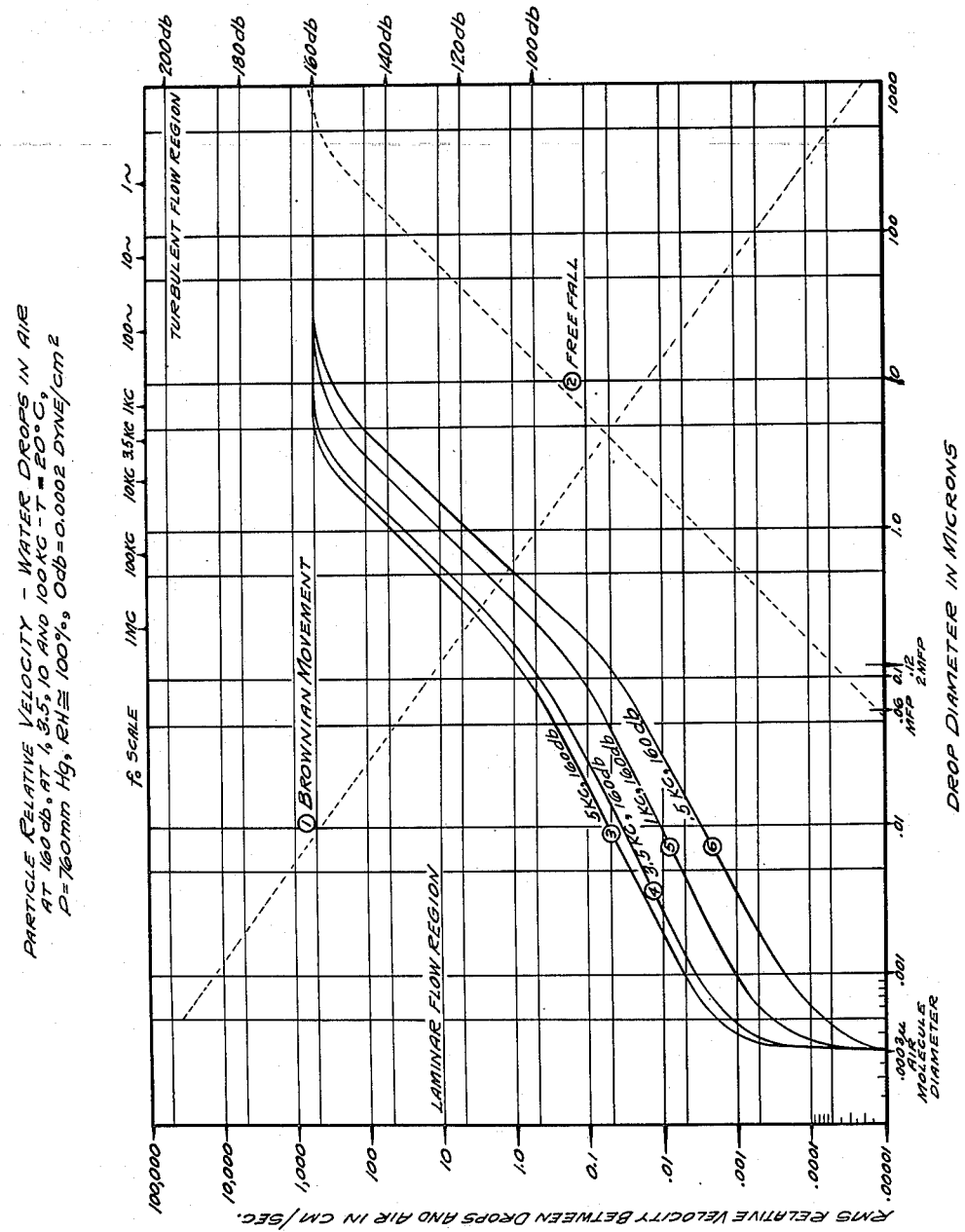

2,535,700

UNITED STATES PATENT OFFICE 2,535,700

PROCESS OF AGGLOMERATING AND
RECOVERING AEROSOL PARTICLES

Gordon C. Seavey, Arlington, and Caperton B.
Horsley, Westwood, Mass., assignors to Ultrasonic Corporation, Cambridge, Mass., a corporation of Massachusetts Application September 29, 1948, Serial No. 51,822

5 Claims. (Cl. 183—114)

Our invention relates to the agglomeration and collection of aerosols by sound waves.

In many industries valuable materials are lost because they are carried off in flue gases or other gas streams in the form of very finely divided particles, so fine that they are suspended in the gas. For example, significant quantities of carbon black are carried off and dissipated into the atmosphere together with their flue gases. In the manufacture of several kinds of soap products large quantities are carried off and are not only lost for all practical purposes, but constitute a serious nuisance in the surrounding neighborhood. There are other instances in which aerosols are undesirable. For example, in petroleum refining there is sometimes formed a fog comprising small droplets of sulphuric acid dispersed in a gas. Natural fog is an aerosol whose presence is a menace to the safety of airline operations.

We are aware that attempts have been made in the past to disperse aerosols or agglomerate aerosol particles by means of sound waves. Such attempts, however, have been uniformly unsuccessful on any practical scale and have been largely curiosities of the laboratory.

We have discovered several important facts regarding the effects of sound waves upon aerosols and have invented a process, based on our discoveries, which may be followed to obtain the successful agglomeration of aerosol particles by the application of sound waves. Prior workers in the field have uniformly directed the use of relatively high frequencies, the most comprehensive range total being between 5 kc. and 100 kc., with an apparent general consensus that the best operating range is between 15 kc. and 40 kc. However, we have made the discovery, surprising under the circumstances, that agglomeration on a practical scale is not to be secured at high frequencies but at very much lower frequencies. In fact, the upper limit of the practical frequency range coincides with what was previously thought to be the lower limit. Moreover, we have made the further discovery that for agglomeration of aerosol particles on a practically commercial scale there is a threshold of intensity below which the agglomeration is insignificant. Other limiting factors will also be discussed in some detail.

The most important object of the invention is to agglomerate aerosol particles with sonic energy on a scale which is commercially practical. We emphasize the practical nature of our invention particularly because the application of our process has actually been successfully applied to aerosols flowing through the system at from 10 to 80 cubic feet per minute.

The present application is a continuation-in-part of our copending application Ser. No. 696,628 filed September 12, 1946, and represents an extension of the thoughts therein expressed which have now been amplified by further discoveries.

We do not propose to embark upon a thorough theoretical consideration of the factors entering into sonic agglomeration of aerosols but will explain the nature of the process sufficiently to impart to those skilled in the art an understanding of the subject sufficient to serve as a background for practical operations. An aerosol comprises particles of solid or liquid matter suspended in a gaseous medium in which they are subject not only to Brownian movement of random direction, but also to the effect of gravity or "free fall." Particles of a given size will have a settling rate dependent upon their mass and drag. The normal movement of the particles occasioned by Brownian action and gravity will produce a certain rate of collision among the particles comprising the aerosol, and if sonic energy is usefully to be employed, it follows that its action must be such as materially will increase the normal collision rate of the particles.

It therefore becomes necessary to understand something concerning the nature of the action of sound on suspended particles, and some of our conclusions are based upon the curves shown in the accompanying figure in which relative speed between droplets and air is plotted against water droplet diameter in microns, the effect of Brownian movement being shown in curve 1 and the effect of gravity being shown in curve 2. Curves 3, 4, 5 and 6 show the effect of sound waves at 160 db. and at frequencies of 5 kc., 3.5 kc., 1 kc., and .5 kc., respectively. The curves were constructed based on the behavior of spherical water droplets but are applicable with corrections for particles of other sizes and substances whose mass and drag may be converted into terms of water droplets of appropriate sizes and plotted on the curves shown in the figure. The curves will be more fully discussed later; for our present purpose it is enough to point out that for a given frequency particles above 25 microns in size will not respond differentially to sound at the frequencies shown. If all particles are moved to the same extent by sound, the collision rate will not be materially affected because there will not be established differential velocities between the particles. Consequently if all the particles comprising an aerosol are of identical size, sound cannot usefully be employed to agglomerate them. It will be noted, however, that at 1 kc. particles of .5 micron will exhibit a speed much different from that imparted to particles 10 microns in size. Consequently in an aerosol containing particles ranging from .5 micron to 10 microns, sound at 1 kc. will materially increase the collision rate.

There are other limiting factors. For example, the spacing must be taken into account. Consider two aerosol particles of different size separated by an amount equal to the average spacing between the particles of the aerosol. These particles will be acted upon and moved by the successive waves of compression and rarefaction of which sound is composed. If the frequency is high at a given intensity, the amplitude of the changes in pressure will be relatively small and we can see that the corresponding amplitude of movement of the particles acted on by the sound will also be small. If, however, the intensity is maintained but the frequency is substantially reduced, the amplitude of the pressure changes will increase and so will the amplitude of movement of the particles. It becomes evident, therefore, that at very high frequencies the particles will not be moved sufficiently to cause them to travel across the average spacing and come into contact. On the other hand, the movement at a lower frequency would be enough to promote collision. It follows that as a given aerosol is subjected to sound waves and the particles are brought into collision with one another, the average spacing between the particles will increase as agglomeration proceeds and the number of particles per given volume decreases. There is, therefore, a maximum spacing beyond which sonic agglomeration cannot usefully be employed. We have discovered relationships from which this maximum obtainable spacing can be determined.

First, however, it is necessary to take into account the difference in behavior of dry and liquid particles. When two liquid particles come into contact, there will inevitably be agglomeration. When two dry particles collide, there may either be agglomeration or disintegration. That is to say, the particles may stick together or the impact may produce smaller particles. A consideration of the maximum spacing obtainable by sonic means involves the concept of displacement which in turn is a function of intensity and frequency. By "displacement," for the present purpose, we mean the distance traversed by a negligibly small portion of air acted upon by the sound. By "negligibly small," we mean insignificant with respect to the wavelength of the sound employed. If the displacement of this negligibly small portion of air be designated by D, we have determined that for dry particles the following equation may be written: $S=20D^2$, where S is the maximum spacing between particles which may be obtained by the use of sound. For liquid particles or droplets we have found that the proper equation is $S=2000D^2$.

Now if we determine the size of the particles in the aerosol, their weight, and the average spacing between the particles of the aerosol, we can determine what can be expected of sound as an agglomerating means. If the spacing determined is greater than S in the equations referred to, it becomes obvious that the application of sound would not serve a useful purpose. As a general rule it may be stated that particles greater than 20 microns in size may effectively be collected in a conventional cyclone separator. Consequently if it is proposed to collect aerosol particles ranging below 20 microns in size, the first step is to determine the grain loading of the aerosol which for general purposes will serve as an indication of whether the spacing is small enough to make it practical to use sound as a means of agglomerating particles to an average size large enough to permit the use of a conventional centrifugal separator. As a general rule it may be stated that if the grain loading is greater than one grain per cubic foot, the aerosol is one which will respond satisfactorily to sound.

We are next faced with the determination of frequency and intensity to be employed. From what has been said it might seem that the lowest obtainable frequency would be the best for the purpose since the amplitude of motion of the particles would be greatest. However, that conclusion is modified by a consideration of the time factor. For practical purposes we are not interested in the number of collisions per cycle, but in the number of collisions per second. At frequencies below 500 C. P. S. the time during which the aerosol must be exposed to the sound in order to bring about effective agglomeration is impractically long. At frequencies above 5000 cycles the intensity requirement becomes impractically great. Inasmuch as aerosol collection on a commercial scale must provide for aerosol flow rates from 1000 or 2000 cubic feet per minute to 100,000, the exposure time cannot exceed 10 seconds. There is another limiting factor in that connection; if the given aerosol is exposed to the action of sound, the agglomeration will proceed until the expression $S=20D^2$ or $S=2000D^2$ has been satisfied. Further exposure will not produce further agglomeration.

While the intensity required will vary somewhat with the frequency employed, we have found that 140 db may be regarded as the threshold of practically useful sound. By the term "db" we mean the intensity above the zero reference level of 0.0002 dynes per square centimeter root means square pressure.

The foregoing theoretical discussion will be found helpful in understanding the mechanics of sonic agglomeration. However, the essence of our invention does not lie in the development of theoretical considerations but in the discovery of how aerosols may be agglomerated and collected on a practical commercial scale. That may be done with sound at an intensity of at least 140 db, at frequencies between .5 and 5 kc. and with exposure times ranging to a maximum of 10 seconds, always provided the aerosol has a grain loading of approximately 1 grain per cubic foot. It might be that if the particles of an aerosol were intrinsically of great value and measured in terms of dollars rather than cents per ounce, it would be worthwhile to employ as low as 500 C. P. S. frequencies and govern the flow of the aerosol to provide a relatively long exposure time. Similarly if the particles comprising the aerosol ran, as an average, significantly below .5 micron in size, it would be worthwhile to operate near the upper limit of 5000 C. P. S. We have found, however, that for aerosols of the types ordinarily encountered in industry it is highly preferable to operate at frequencies between 1000 and 3500 C. P. S., since at this frequency it is possible to agglomerate and collect, on a commercially practical scale, such aerosols as carbon black, cement dust, fly ash, acid fogs and the like.

As an example of one satisfactory embodiment of the invention we have successfully agglomerated and collected large volumes of aerosol particles by employing the following technique. A siren is mounted concentrically within a 30' cylindrical chamber having an 8' diameter and provided with an inner cylinder 4' in diameter, the sound waves being propagated radially into the annular space between the cylinders. The aerosol to be treated is forced through the annulus at the rate of 30,000 C. F. M. which gives an exposure time of 0.3 second, the aerosol having a grain loading of approximately two grains per cubic foot. The siren is operated to produce a maximum intensity adjacent the radiating orifice of 160 db at a frequency of 1.7 kc. It was observed that the fine particles of the aerosol were agglomerated in the chamber to an average diameter in excess of 20 microns. Coupled to the discharge end of the chamber was a plurality of cyclone separators in which the solid particles were collected. An installation of the type described has proved effective to collect soda ash particles ordinarily wasted in the process of burning the black liquor in a paper mill. A similar system has been successfully operated to agglomerate and collect carbon black particles ordinarily lost with the flue gases leaving a carbon black producing furnace. We have found that approximately 93% of the carbon black particles were collected.

Regulation of the temperature of the aerosol flowing through the system may be productive of enhanced results. As the temperature of the aerosol is decreased, the grain loading is increased. Therefore, by extracting heat from the aerosol prior to its entry into the sonic agglomerator, the yield from the agglomerator may be increased and the heat usefully applied wherever needed. At the same time it is undesirable, in many instances, to reduce the temperature of the aerosol below the dew point. For example, if soda ash leaving the black liquor furnace is reduced below the dew point, black tarry condensates form which make the product useless as salt cake in the paper industry. Consequently, one important feature of our invention comprises reducing the temperature of a hot aerosol to a value just above the dew point in order to increase the grain loading and the yield from the agglomerator without also producing unwanted condensates.

Having now described our invention what we claim as new and desire to secure by Letters Patent of the United States is:

1. The method of treating aerosols to increase the average particle size to an extent permitting centrifugal separation comprising generating in an enclosure a sound field at an intensity of at least 140 db and a frequency of between 500–5000 C. P. S., and flowing the aerosol continuously through the enclosure at a rate sufficient to expose the aerosol particles to the action of sound for an average time not exceeding 10 seconds.

2. The method of treating aerosols to increase the average particle size to an extent permitting centrifugal separation comprising flowing the aerosol through an enclosure, generating a sound field in the enclosure at a maximum intensity of at least 140 db at a frequency of from 500–5000 C. P. S., and continuing the exposure until the average spacing between the particles of the aerosol reaches maximum in accordance with the formulae $S=20D^2$ for dry particles and $S=2000D^2$ for liquid particles, where $S$=maximum obtainable spacing and $D$=displacement of a portion of air smaller than wavelength of the sound acting on it.

3. The method of treating aerosols to increase the average particle size to an extent permitting centrifugal separation comprising flowing the aerosol through an enclosure, and generating an intense sound field within the enclosure of at least 140 db and at a frequency within the range of 500–5000 C. P. S.

4. The method of treating aerosols to increase the average particle size to an extent permitting centrifugal separation comprising flowing the aerosol through an enclosure, extracting heat from the aerosol, maintaining the aerosol at a temperature slightly above the dew point, and generating sound waves in the enclosure at an intensity of at least 140 db and at a frequency within the range of 500–5000 C. P. S.

5. The method of treating an aerosol containing particles ranging in size from .5 microns to 10 microns to increase the average particle size to an extent permitting centrifugal separation comprising flowing the aerosol through an enclosure, and generating in the enclosure a sound field at an intensity of at least 140 db and a frequency of approximately 1000 C. P. S.

GORDON C. SEAVEY.
CAPERTON B. HORSLEY.

REFERENCES CITED

The following references are of record in the file of this patent:

UNITED STATES PATENTS

| Number | Name | Date |
|---|---|---|
| 1,130,213 | Sterre | Mar. 2, 1915 |
| 2,215,484 | St. Clair | Sept. 24, 1940 |
| 2,216,779 | Houghton et al. | Oct. 8, 1940 |
| 2,300,761 | Amy | Nov. 3, 1942 |